(12) United States Patent
Huddleston

(10) Patent No.: US 10,654,397 B2
(45) Date of Patent: May 19, 2020

(54) BOAT MOTOR SUPPORT SYSTEM

(71) Applicant: WHITE RIVER MARINE GROUP, LLC, Springfield, MO (US)

(72) Inventor: Rick Huddleston, Yellville, AR (US)

(73) Assignee: WHITE RIVER MARINE GROUP, LLC, Springfield, MO (US)

( * ) Notice: Subject to any disclaimer, the term of this patent is extended or adjusted under 35 U.S.C. 154(b) by 0 days.

(21) Appl. No.: 15/907,814

(22) Filed: Feb. 28, 2018

(65) Prior Publication Data

US 2019/0263313 A1   Aug. 29, 2019

(51) Int. Cl.
*A47F 5/00* (2006.01)
*B60P 3/10* (2006.01)

(52) U.S. Cl.
CPC .................................. *B60P 3/1033* (2013.01)

(58) Field of Classification Search
CPC ...................................................... B63H 20/36
See application file for complete search history.

(56) References Cited

U.S. PATENT DOCUMENTS

| | | |
|---|---|---|
| 1,987,943 A | 1/1935 | Munson |
| 2,901,267 A | 8/1959 | Holsclaw |
| 3,173,644 A | 3/1965 | Burfiend |
| 3,941,344 A | 3/1976 | Paterson |
| 4,331,431 A | 5/1982 | Estes |
| 4,650,427 A | 3/1987 | Huchinson |
| 4,685,888 A | 8/1987 | Brewer |
| 4,828,186 A | 5/1989 | Weiss |
| 4,842,239 A | 6/1989 | Kinsey et al. |
| 5,021,016 A | 6/1991 | Currey |
| 5,525,082 A | 6/1996 | Lee et al. |
| 5,631,842 A | 5/1997 | Habra et al. |
| 5,775,669 A * | 7/1998 | Huggins ............... B63H 20/36 248/351 |
| 6,447,350 B2 | 9/2002 | Thompson et al. |
| 6,494,451 B2 | 12/2002 | Michel |
| 6,513,782 B2 | 2/2003 | Fischer |

(Continued)

OTHER PUBLICATIONS

Office Action dated Aug. 27, 2018 in related U.S. Appl. No. 15/094,964, 12 pages.

(Continued)

*Primary Examiner* — Amy J. Sterling
(74) *Attorney, Agent, or Firm* — Pillsbury Winthrop Shaw Pittman LLP

(57) ABSTRACT

A system for supporting a motor of a boat with respect to a boat trailer is provided. The system includes a support member, a trailer connector constructed and arranged to be releasably attached to a portion of the boat trailer, and a motor support constructed and arranged to frictionally engage portions of the motor of the boat. The motor support includes a base member, a first and a second hinge members extending from spaced locations on the base member, and a first and a second clamp members. The first and second clamp members are pivotably connected with the first and second hinge members, respectively. The first and the second clamp members, and the first and the second hinge members are adjustably cooperable to receive and engage opposite sides of the motor, and to facilitate engagement of the front of the motor with the base member.

13 Claims, 10 Drawing Sheets

(56) References Cited

U.S. PATENT DOCUMENTS

| | | | |
|---|---|---|---|
| 7,278,893 B1 | 10/2007 | Frantz | |
| 7,556,545 B2 | 7/2009 | Draghici | |
| 9,145,194 B2* | 9/2015 | Marks | B63H 20/36 |
| 2001/0044243 A1* | 11/2001 | Thompson | B63H 20/36 440/55 |
| 2008/0029683 A1 | 2/2008 | Draghici | |
| 2016/0297346 A1 | 10/2016 | Huddleston | |

OTHER PUBLICATIONS

International Search Report PCT/US2016/026826 dated Sep. 16, 2016.
International Preliminary Report on Patentability PCT/US2016/026826 dated Oct. 10, 2017.
Office Action dated Sep. 23, 2019 in related Canada Patent Application No. 2979286, 5 pages.
Notice of Allowance dated Sep. 3, 2019 in related U.S. Appl. No. 15/094,964 10 pages.

* cited by examiner

BOAT MOTOR SUPPORT SYSTEM

FIELD

The present patent application relates to a system for supporting a motor of a boat with respect to a boat trailer.

BACKGROUND

When transporting a boat on a trailer, a motor of the boat is supported in a fixed position to limit the amount of vibrational stress a bouncing motor can put on the transom of the boat. Some boats may include built-in mechanisms to support the motors while others do not. However, even the built-in support mechanisms on some boats still are prone to disengaging when rough road surfaces are encountered.

In some instances, a separate motor support mechanism may be used to support the motor in a fixed, elevated fashion, as a standalone motor support. However, just like some built-in motor support mechanisms, some separate motor support mechanisms are prone to being jarred loose, leading to possible damage to the motor, boat trailer, or motor support mechanism itself. Further, attaching a separate support mechanism can be a cumbersome process, causing some users to forego use of a separate support mechanism entirely.

FIG. 1 shows a prior art motor support 1000 for supporting an engine/a motor 1004 of a boat 1006 with respect to a boat trailer (not shown). The motor support 1000 generally includes two arms 1002 (only one arm is shown in FIG. 1) that are in contact with both sides $S_1$ and $S_2$ of the motor 1004 for supporting the motor 1004 with respect to the boat trailer. The motor 1004, when being supported by the motor support 1004, applies side load SL on the arms 1002. For example, a side load force going outward in the direction of the arrow $SL_1$ is applied on the right side arm 1002 of the motor support 1000 and a side load force going outward in the direction of the arrow $SL_2$ is applied on the left side arm 1002 of the motor support 1000.

Also, when the motor 1004 is being supported by the motor support 1004, a gap G exists between the front F of the motor 1004 and a portion P of the motor support 1000. That is, when the motor 1004 is being supported by the motor support 1004, the load applied by the motor 1004 on the motor support 1000 is only applied on the arms 1002 and is not evenly distributed throughout the entire periphery of the motor support 1000. The side load applied by the motor 1004 on the motor support 1000 may result in breakage of the motor support 1000. For example, a break in the motor support 1000 due to the side load SL may form, for example, along the line B.

Therefore, improvements in the design of a motor support mechanism are needed

SUMMARY

One embodiment of the present patent application provides a system for supporting a motor of a boat with respect to a boat trailer. The system includes a support member, a trailer connector, and a motor support. The support member has a first end portion and a second end portion. The trailer connector is disposed at the first end portion of the support member and is constructed and arranged to be releasably attached to a portion of the boat trailer. The motor support is disposed at the second end portion of the support member and is constructed and arranged to frictionally engage portions of the motor of the boat. The motor support includes a base member, a first and a second hinge members, and a first and a second clamp members. The first and the second hinge members are extending from spaced locations on the base member. Each of the first and the second hinge members is pivotably adjustable with respect to the base member. The first clamp member is pivotably connected with the first hinge member. The second clamp member is pivotably connected with the second hinge member. The first and the second clamp members, and the first and the second hinge members are adjustably cooperable to receive and engage opposite sides of the motor, and to facilitate engagement of the front of the motor with the base member.

Another embodiment of the present patent application provides a system for supporting a motor of a boat with respect to a boat trailer. The system includes a motor support. The motor support includes a base member, a first and a second hinge members, and a first and a second clamp members. The first and the second hinge members are extending from spaced locations on the base member. Each of the first and the second hinge members is pivotably adjustable with respect to the base member. The first clamp member is pivotably connected with the first hinge member. The second clamp member is pivotably connected with the second hinge member. The first and the second clamp members, and the first and the second hinge members are adjustably cooperable to receive and engage opposite sides of the motor, and to facilitate engagement of the front of the motor with the base member.

Yet another embodiment of the present patent application provides a method for supporting a motor of a boat with respect to a boat trailer using a motor support. The motor support comprises a base member, first and second hinge members extending from spaced locations on the base member and pivotably connected with the base member, and first and second clamp members pivotably connected with the first and the second hinge members, respectively. The method comprises pivotably adjusting each of the first and the second hinge members with respect to the base member; and pivotably adjusting the first and the second clamp members with respect to the first and the second hinge members, respectively. Cooperable adjustment between the first and the second clamp members and the first and the second hinge members facilitates engagement of opposite sides of the motor with the first and the second clamp members, respectively, and engagement of the front of the motor with the base member.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. As used herein, the term "may" as used in connection with any structural or functional attributes, will in some embodiments have those attributes, but that such structural or functional attributes are not required in all embodiments.

DETAILED DESCRIPTION OF THE DRAWINGS

Figure 1:
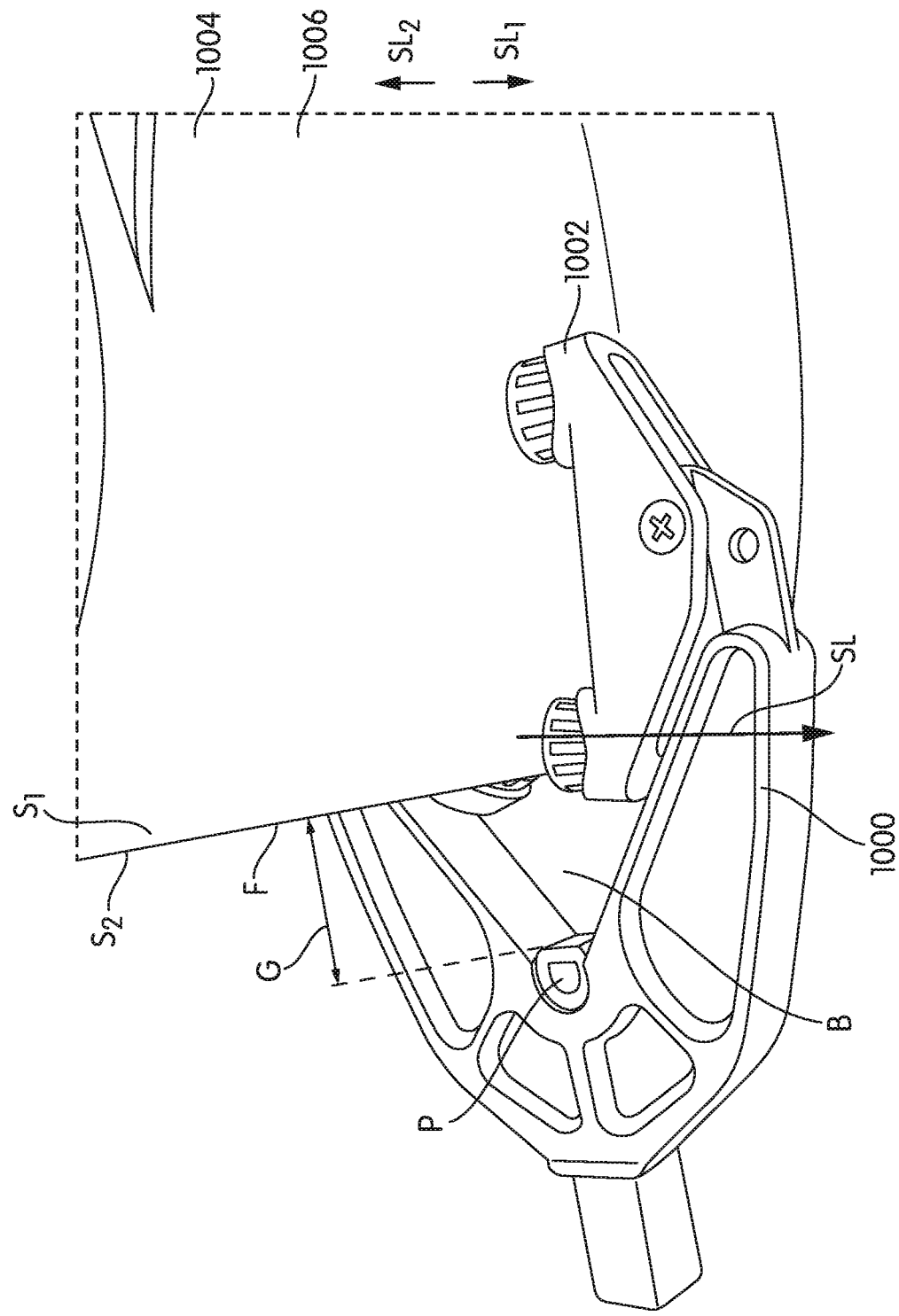
FIG. 1 illustrates a prior art motor support system.

Various embodiments will be described in detail, by way of example only, with reference to the accompanying schematic drawings, wherein corresponding reference symbols indicate corresponding parts and like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 2:
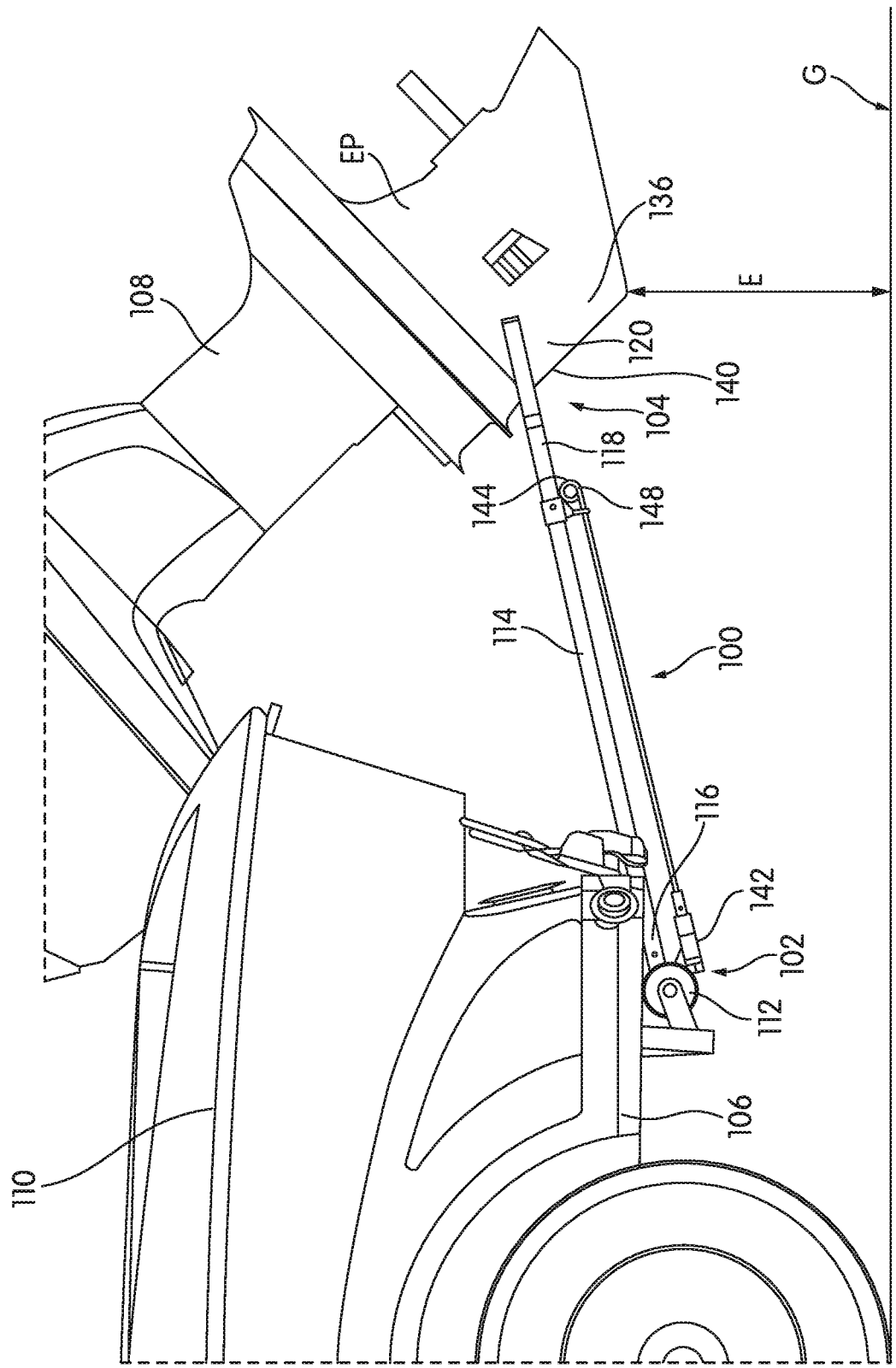
FIG. 2 illustrates a schematic side view of a system for supporting a motor of a boat with respect to a boat trailer in accordance with an embodiment of the present patent application.

FIG. 2 shows a perspective isometric view of a system 100 for supporting a motor 108 of a boat 110 with respect to a boat trailer 106 in accordance with an embodiment of the present patent application. In one embodiment, the system 100 is positioned or disposed between the boat trailer 106 and the motor 108 of the boat 110. In one embodiment, the system 100 is configured to hold the motor 108 of the boat 110 in a fixed, elevated position EP (e.g., elevated by a distance of E from the ground G) so that the lowest point of the motor 108 (i.e., the propeller (not shown)) is elevated from the ground G.

Referring to 2-6, the system 100 includes a support member 114, a trailer connector 102, and a motor support 104. In one embodiment, the support member 114 has a first end portion 116 and a second end portion 118. In one embodiment, the trailer connector 102 is disposed at the first end portion 116 of the support member 114. In one embodiment, the trailer connector 102 is constructed and arranged to be releasably attached to a portion 112 (e.g., keel roller 112) of the boat trailer 106. In one embodiment, the motor support 104 is disposed at the second end portion 118 of the support member 114. In one embodiment, the motor support 104 is constructed and arranged to frictionally engage portions 120 of the motor 108 of the boat 110.

In one embodiment, the motor support 104 includes a base member 122, a first and a second hinge members 124 and 126, and a first and a second clamp members 128 and 130. In one embodiment, the first and the second hinge members 124 and 126 are extending from spaced locations 132 and 134 on the base member 122. In one embodiment, each of the first and the second hinge members 124 and 126 is pivotably adjustable with respect to the base member 122. In one embodiment, the first clamp member 128 is pivotably connected with the first hinge member 124. In one embodiment, the second clamp member 130 is pivotably connected with the second hinge member 126. In one embodiment, the first and the second clamp members 128 and 130, and the first and the second hinge members 124 and 126 are adjustably cooperable to receive and engage opposite sides 136 and 138 of the motor 108, and to facilitate engagement of the front 140 of the motor 108 with the base member 122.

In one embodiment, the support member 114 may be a support shaft. In one embodiment, the support member 114 may generally a hollow construction. In another embodiment, the support member 114 may generally have a solid construction. In one embodiment, the support member 114 may have a generally circular cross-sectional configuration. In another embodiment, the support member 114 may have other cross-sectional configurations as would be appreciated by one skilled in the art.

In one embodiment, the support member 114 may be made of an appropriate metal (such as aluminum or steel) or other material of suitable strength. In one embodiment, the support member 114 may be made of molded plastic material. In one embodiment, the support member 114 may be made of any other suitable material or combination of materials having sufficient durability to support the motor 108 of the boat 110 with respect the boat trailer 106 while maintaining structural stability of the system 100. In one embodiment, the support member 114 may be made by an extrusion procedure. In one embodiment, the support member 114 may be made by other procedures as would be appreciated by one skilled in the art.

In one embodiment, the first end portion 116 of the support member 114 may be referred to as a trailer end portion. In one embodiment, the second end portion 118 of the support member 114 may be referred to as a motor end portion. In one embodiment, the trailer connector 102 positioned or disposed at the trailer/first end portion 116 of the support member 114 is in contact with the boat trailer 106, and the motor support 104 positioned or disposed at the motor/second end portion 118 of the support member 114 is in contact with the motor 108. In one embodiment, as will be clear from the discussions below, the trailer connector 102 is latched to the boat trailer 106, for example, to the keel roller 112 of the boat trailer 106. In one embodiment, the keel roller 112 is a part of the boat trailer 106 shown in FIG. 2.

In one embodiment, the support member 114 may be configured to be adjustable in length. In one embodiment, the support member 114 may be configured to be longitudinally extendable. That is, the longitudinally extendable support member 114 is configured to be secured in a selected one of a plurality of extended positions.

Figure 3:
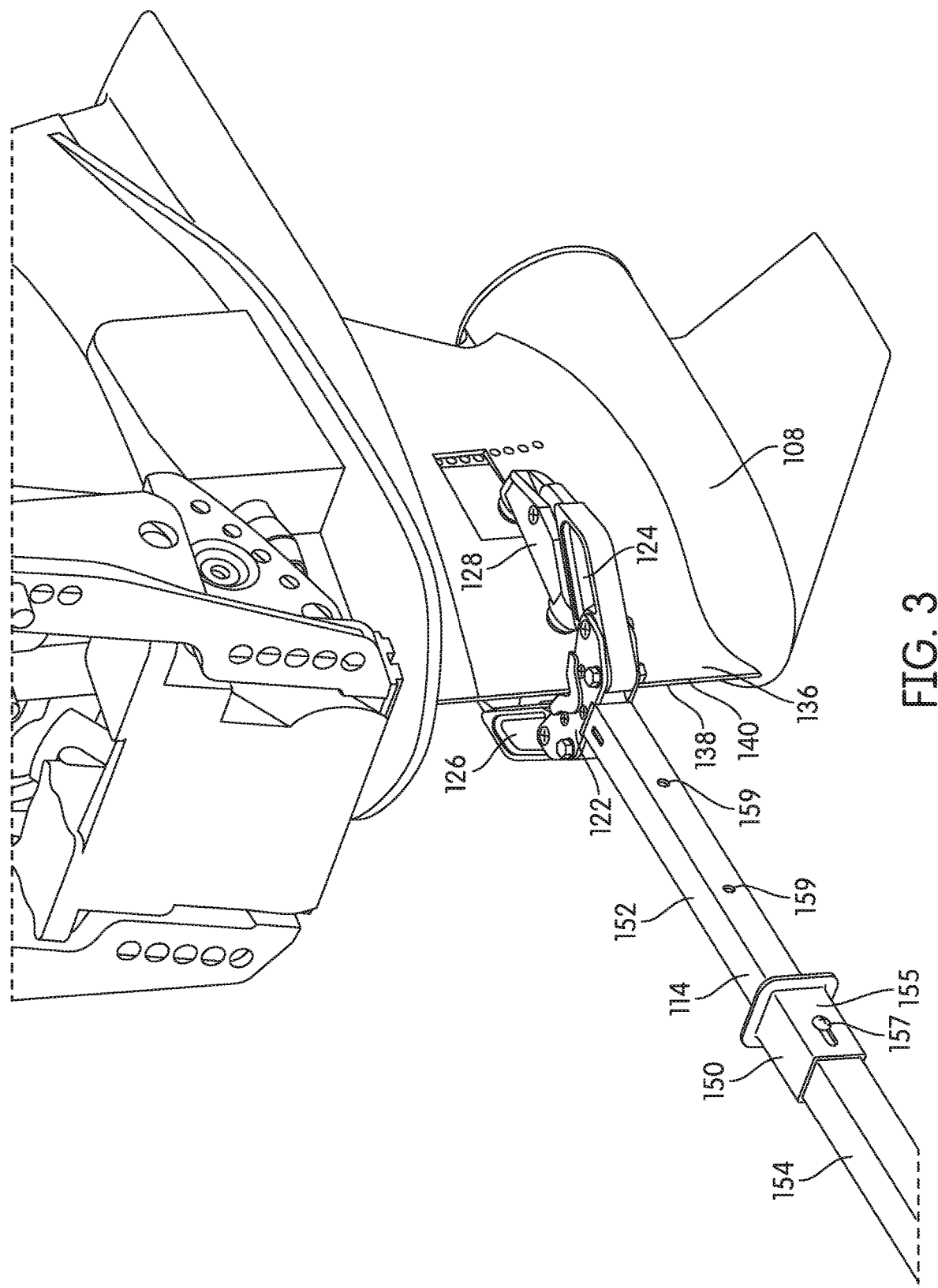
FIG. 3 illustrates a partial, perspective view of the system for supporting the boat motor with respect to the boat trailer, where the boat trailer is not shown for sake of clarity and to better illustrate other portions of the system, in accordance with an embodiment of the present patent application.

In one embodiment, referring to FIGS. 2 and 3, the support member 114 includes a first support member 152 constructed and arranged to support the motor 108 of the boat 110, and a second support member 154 constructed and arranged to be releasably secured to the portion 112 of the boat trailer 106. In one embodiment, the trailer connector 102 is integrally formed with the second support member 154 of the support member 114. In one embodiment, the trailer connector 102 is disposed or formed at the trailer/first end portion 116 of the second support member 154. In one embodiment, the motor support 104 is integrally formed with the first support member 152 of the support member 114. In one embodiment, the motor support 104 is disposed or formed at the motor/second end portion 118 of the first support member 152.

In one embodiment, one of the first support member 152 and the second support member 154 is constructed and arranged to be received by and extending in and out of other of the first support member 152 and the second support member 154 to facilitate longitudinal telescopic movement between first and second support members 152 and 154. In one embodiment, one of the first support member 152 and the second support member 154 is configured to be moved and adjusted longitudinally along the longitudinal axis L-L of the support member and with respect to other of the first support member 152 and the second support member 154 in the plurality of longitudinally extended positions as desired by the user.

In one embodiment, the system 100 includes a lock assembly 155 that is constructed and arranged to selectively lock the first and second support members 152 and 154 at one of a plurality of longitudinally extended positions. In one embodiment, the lock assembly 155 comprises a lock member 157 that is movable between a first position and a second position. In one embodiment, the lock member 157 is linked to lock components 159 associated with the first and second support members 152 and 154 so that the movement of the lock member 157 from the first position to the second position unlocks the lock assembly 155 to enable the longitudinal telescopic movement between first and second support members 152 and 154. In one embodiment, the lock assembly 155 includes a bias member that is constructed and arranged to lock the lock assembly 155 at a selected position and to prevent relative movement of the first and second support members 152 and 154.

In one embodiment, the construction, the components and the operation of the lock assembly 155 (along with its lock components 159, its lock member 157, its bias member, etc.) and the longitudinally extendable support member 114 (along with two support members 152, 154) of the present patent application are similar to that of the lock assembly and the longitudinally extendable support member described in detail in U.S. patent application Ser. No. 15/094,964, which is incorporated herein by reference in its entirety. As would be appreciated by one of skill in the art, various other suitable lock assemblies having different constructions and operations may be used in the present patent application for selectively locking the first and second support members 152 and 154 at one of a plurality of longitudinally extended positions.

Figure 4:
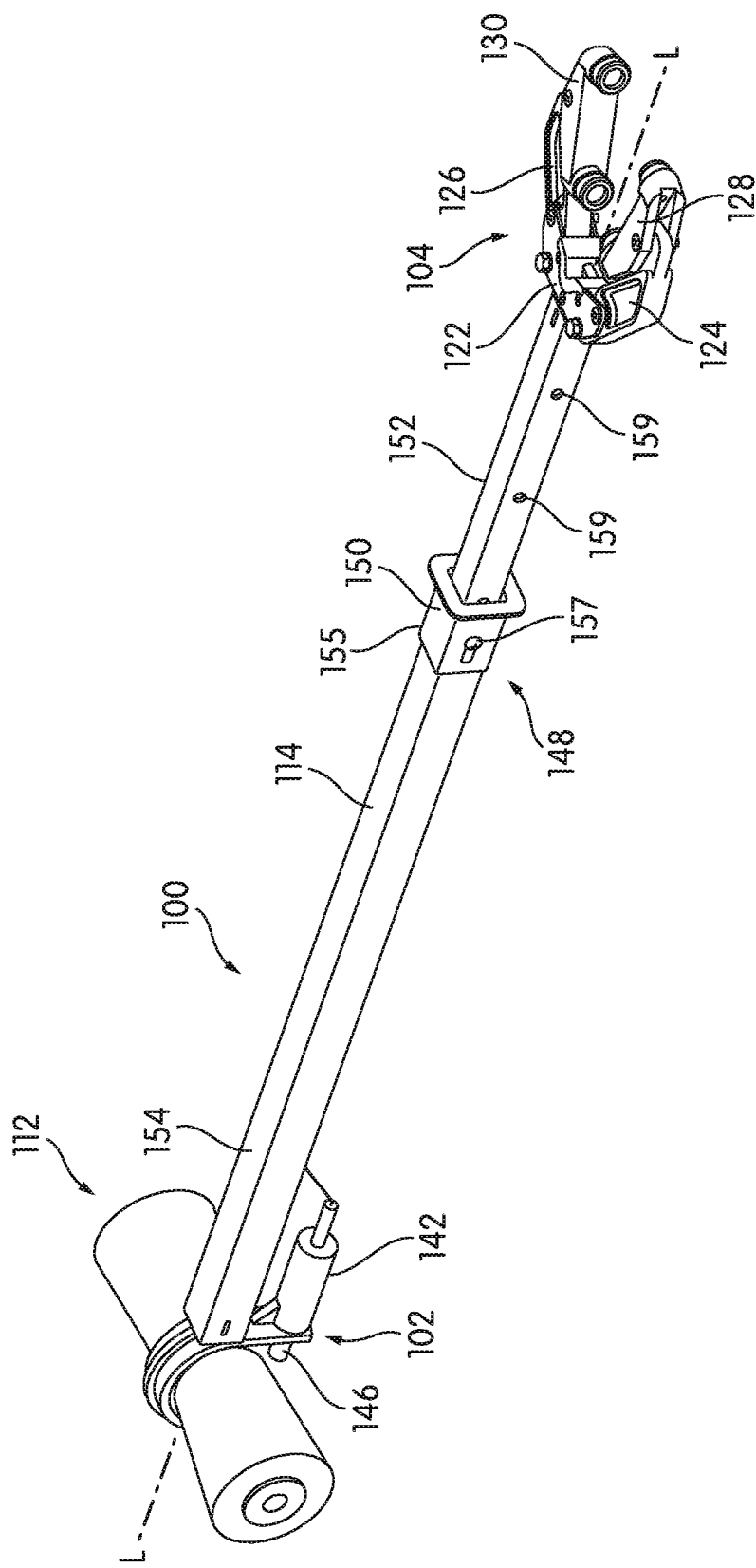
FIG. 4 illustrates a perspective view of the system for supporting the boat motor with respect the boat trailer, where the boat motor and portions of the boat trailer are not shown for sake of clarity and to better illustrate other portions of the system, in accordance with an embodiment of the present patent application.
Figure 5:
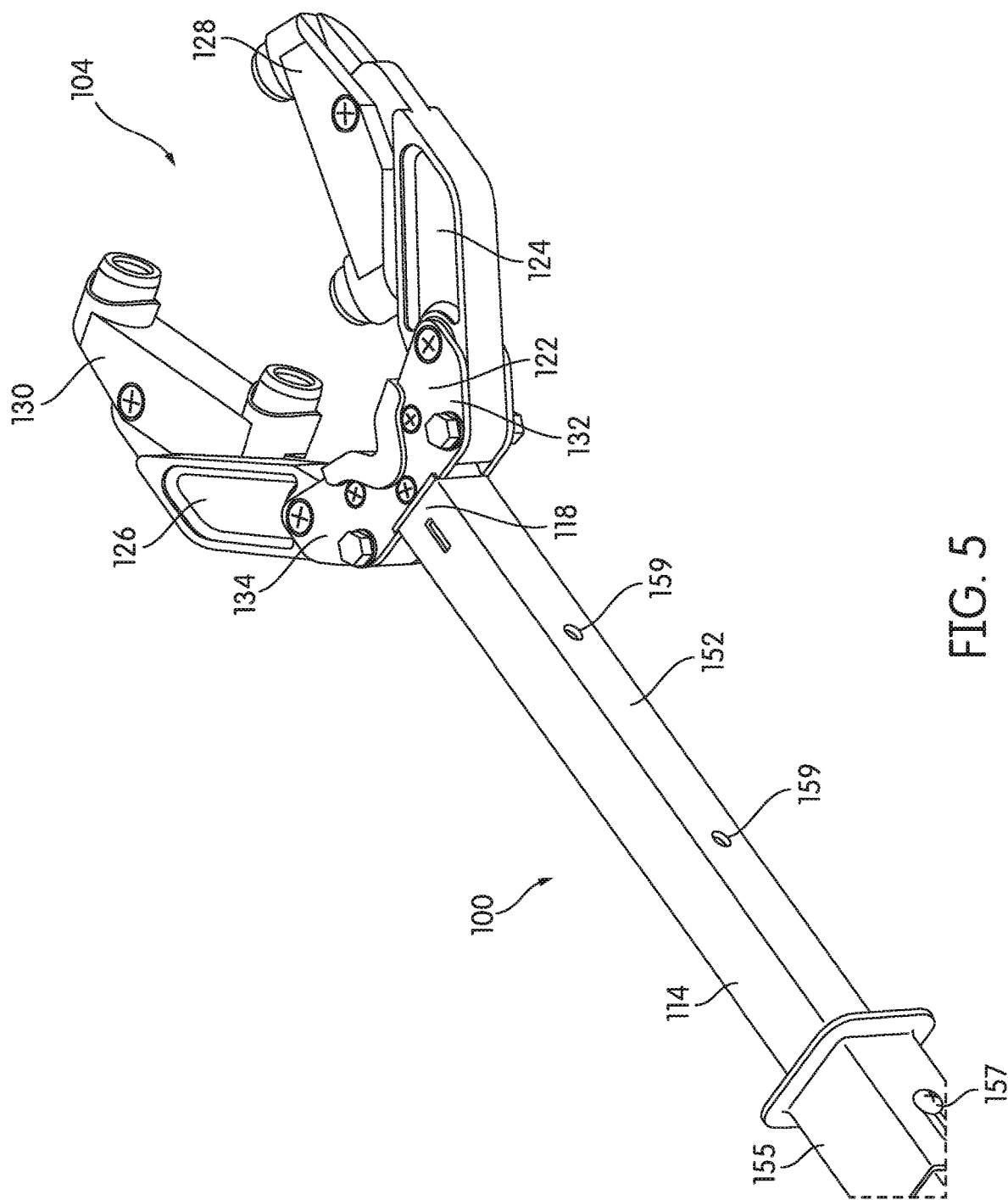
FIG. 5 illustrates a partial, perspective view of the system for supporting the boat motor with respect the boat trailer where the boat motor and portions of the boat trailer not shown for sake of clarity and to better illustrate other portions of the system, in accordance with an embodiment of the present patent application.

In one embodiment, referring to FIG. 4, a releasable latch mechanism 142 is constructed and arranged to releasably or removably secure the trailer connector 102 of the system 100 to the portion 112 of the boat 106.

In one embodiment, the releasable latch mechanism 142 includes a latch member 146 moveable between a latched position and a released (or unlatched) position. In the latched position, the latch member 146 is constructed and arranged to retain the portion 112 (i.e., kneel roller) of the boat trailer 106 within the trailer connector 102 of the system 100. In one embodiment, the latch member 146 is constructed and arranged to connect the trailer connector 102 to the boat trailer 106. In one embodiment, the latch member 146 is constructed and arranged to be movable in the direction of the longitudinal axis L-L of the support member 114 between the latched position and the released position. In another embodiment, the latch member 146 is constructed and arranged to be pivotable between the latched position and the released position. In one embodiment, the releasable latch mechanism 142 includes a bias member (not shown) constructed and arranged to bias the latch member 146 toward the latched position. In one embodiment, the bias member is a spring.

In one embodiment, the construction, the components and the operation of the releasable latch mechanism of the present patent application are similar to that of any of the latch mechanisms described in detail in U.S. patent application Ser. No. 15/094,964, which is incorporated herein by reference in its entirety. As would be appreciated by one of skill in the art, various other suitable releasable latch mechanisms having different constructions and operations may be used in the present patent application for retaining the portion 112 of the boat trailer 106 within the trailer connector 102 of the system 100.

In one embodiment, referring to FIG. 4, the system 100 includes a manually enagageable actuator 148 that is configured to selectively latch or release the trailer connector 102 from the boat trailer 106. In one embodiment, as shown in FIG. 2, the manually enagageable actuator 148 may be in the form of a pull handle 144 that is operable against a bias of the spring for selectively latching or releasing the trailer connector 102 of the system 100 from the boat trailer 106. In another embodiment, as shown in FIG. 4, the manually enagageable actuator 148 may be in the form of a moveable (slideable) manually enagageable member 150 that is configured to selectively latch or release the trailer connector 102 of the system 100 from the boat trailer 106. In one embodiment, the manually enagageable actuator 148 is positioned near the motor end 118 to ensure ease of access by the user during operation of the system 100. In another embodiment, the manually enagageable actuator 148 is positioned at any other location that may be easily accessed by the user during operation of the system 100. In one embodiment, the construction, the components and the operation of the manually enagageable actuator of the present patent application are similar to that of any of the manually enagageable actuators described in detail in U.S. patent application Ser. No. 15/094,964, which is incorporated herein by reference in its entirety. As would be appreciated by one of skill in the art, various other suitable manually enagageable actuators having different constructions and operations may be used in the present patent application for selectively latching or releasing the trailer connector 102 from the boat trailer 106.

Even though a number of embodiments of the system 100 have been described as including spring-loaded latch mechanisms or lock assemblies, other types of latch mechanisms or lock assemblies may be used. For example, in one embodiment, the element(s) of these latch mechanisms or lock assemblies may be movable between the closed position and the open position by way of an electrical signal (e.g., an electric switch). The electrical signal can be transferred from a switch at the motor end 118, to a series of wires, and then to a (an electrical) controller. In such an embodiment, the controller may be configured to control the element(s) of these latch mechanisms or lock assemblies. In one embodiment, the element(s) of these latch mechanisms or lock assemblies may be movable by way of a (an electrical) solenoid. Manual levers or similar mechanical mechanisms may also be used to control the element(s) of these latch mechanisms or lock assemblies. In another embodiment, the latch mechanisms or lock assemblies may have a combination of electrical and mechanical components.

In one embodiment, as shown in FIGS. 5-8, the motor support 104 includes a generally U-shaped configuration or V-shaped configuration. In another embodiment, the motor support 104 may have other shaped configurations as long as the motor support 104 conforms to and frictionally engages with portions of the motor 108 circumferentially at axially spaced locations. In one embodiment, the axially spaced locations may include the front 140 of the motor 108 and the opposite sides 136 and 138 of the motor 108. In one embodiment, as will be described in detail below, mechanical damping material (e.g., such as foam) may be attached to portions of the motor support 1004 that conform to and frictionally engage with the front 140 and the opposite sides 136 and 138 of the motor 108.

In one embodiment, the motor support 104 includes the base member 122, the first and the second hinge members 124 and 126, and the first and the second clamp members 128 and 130.

Figure 6:
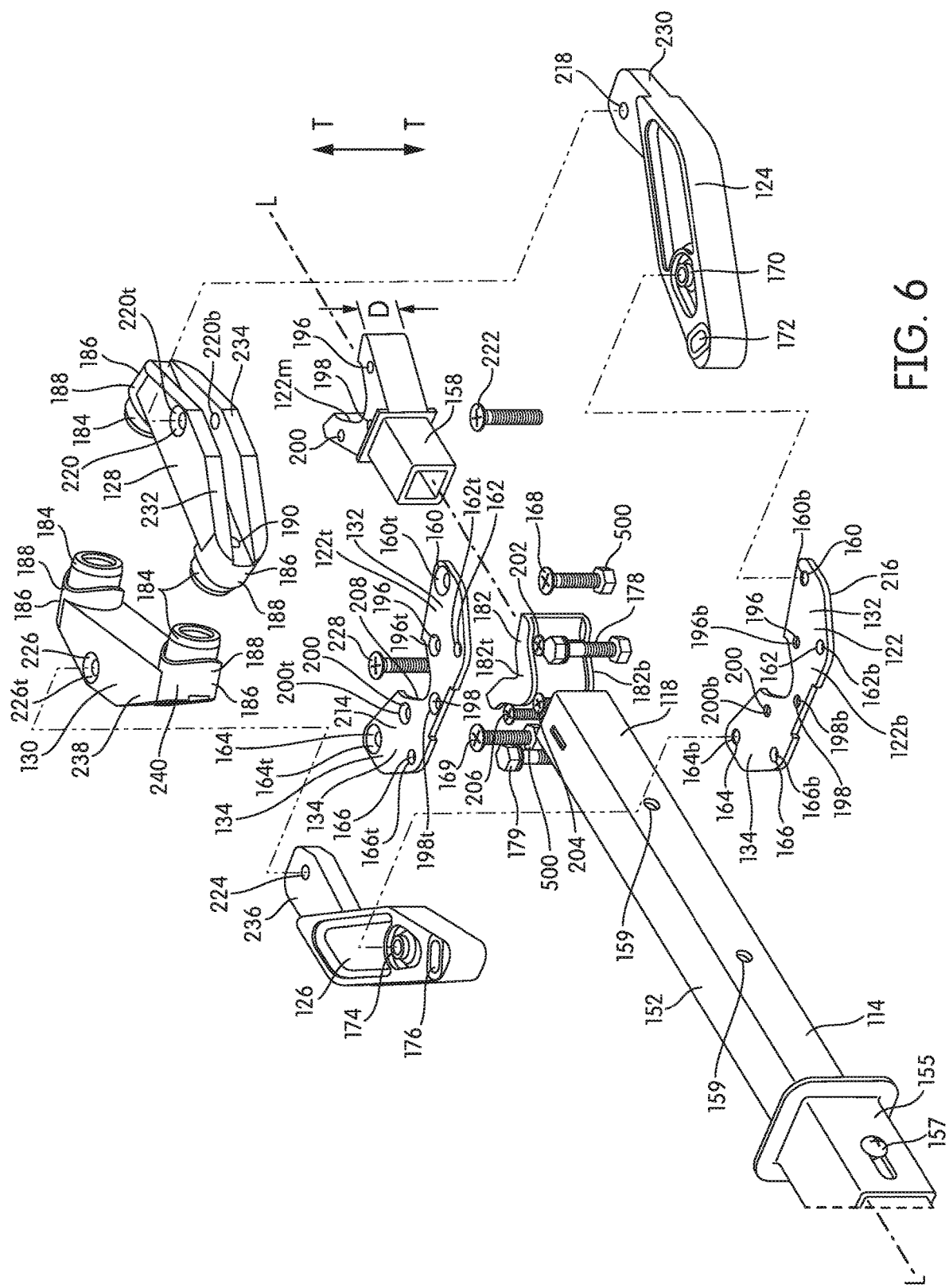
FIG. 6 illustrates an exploded view of the system for supporting the boat motor with respect the boat trailer in accordance with an embodiment of the present patent application.

In one embodiment, referring to FIG. 6, the base member 122 includes base members 122*t*, 122*m* and 122*b*. In one embodiment, the base members 122*t* and 122*b* are spaced apart, along a direction T-T that is perpendicular to the longitudinal direction L-L of the support member 114, from each other by a distance that is slightly greater than dimension D. In one embodiment, the base member 122*m* has a thickness dimension of D. In one embodiment, the base member 122*m* is configured to be received between the two base members 122*t* and 122*b*, when the two base members 122*t* and 122*b* are connected to each other using pin members 168, 169, 178 and 179. In one embodiment, the base member 122*m* is integrally formed with a connector portion 158. The connector portion 158 of the motor support 104 is described in detail below.

Each of the base members 122*t* and 122*b* includes four openings 160 and 162, 164 and 166 that are configured to align on a same axis with openings 170 and 172 on the first hinge member 124 and with openings 174 and 176 on the second hinge member 126 and to receive four lock or pivot members or pins 168 and 169, 178 and 179 therein to pivotably adjustably connect each of the first and second hinge members 124 and 126 with corresponding portions of the base member 122. For example, the openings 160*t* and 160*b* of the base member 122 align on a same axis with each other and with the opening 170 of the first hinge member 124 to receive the pivot pin member 168. In one embodiment, the openings 162*t* and 162*b* of the base member 122 align on a same axis with each other and with the opening 172 of the first hinge member 124 to receive the lock pin member 178. In one embodiment, the openings 164*t* and 164*b* of the base member 122 align on a same axis with each other and with the opening 174 of the second hinge member 126 to receive the pivot pin member 169. In one embodiment, the openings 166*t* and 166*b* of the base member 122 align on a same axis with each other and with the opening 176 of the second hinge member 126 to receive the lock pin member 179. In one embodiment, the openings 170 and 172 have elliptical shaped cross-sectional configuration.

In one embodiment, the openings 160 and 162 are formed at the location 132 of the base member 122 and the openings 164 and 166 are formed at the location 134 of the base member 122. In one embodiment, the locations 132 and 134 are referred to as the spaced locations on the base member 122. That is, the locations 132 and 134 are spaced apart on the base member 122.

Each of the base members 122*t*, 122*m* and 122*b* includes three openings 196, 198 and 200 that are configured to align on a same axis with each other and to receive three connecting members or pins 202, 204 and 206 therein to connect the base members 122*t*, 122*m* and 122*b* together. In one embodiment, all base members 122*t*, 122*m*, and 122*b* may be integrally formed. In other embodiments, the base member 122, instead of having three base members 122*t*, 122*m*, 122*b*, may have a single base member that has snap-fit engagement with the base clamp member 182 and that pivotably, adjustably connects with the first and second hinge members 124 and 126.

In one embodiment, the base member 122 includes the base clamp member 182 that is configured to engage with and support the front 140 of the motor 108. In one embodiment, the base clamp member 182 includes a top flange 182*t*, a body portion 182*m* and a bottom flange 182*b*. Each of the base members 122*t*, 122*m* and 122*b* includes three cutout portions 208, 210, 212 that are configured to align on a same axis with each other. In one embodiment, the three cutout portions 208, 210, 212 are configured to receive the body portion 182*m* of the base clamp member 182 and to engage with surfaces of the body portion 182*m*. In one embodiment, the cutout portions 208, 210 and 212 are constructed and sized so as to provide a snap-fit coupling of the base clamp member 182 with the base member 122. In one embodiment, a resilient deformation of the flanges 182*t* and 182*b* allows snap engagement of each flange 182*t* and 182*b* on respective surfaces 214, 216 of the base member 122*t* and 122*b* to thereby secure the base clamp member 182 and the base member 122 together by snap engagement. In one embodiment, adhesive is further provided so as to secure and couple the base clamp member 182 with the base member 122. In one embodiment, the body portion 182*m* of the base clamp member 182 has a thickness dimension of D.

In one embodiment, the base clamp member 182 includes surfaces made of high friction, resilient, rubber-like material for frictionally engaging the front 140 of the motor 108 of the boat 110. In one embodiment, the base clamp member 182 is configured to frictionally engage the front 140 of the motor 108 of the boat 110 to retain (firmly grip, or secure) the motor 108 in the motor support 104, for example, without separate fasteners. In one embodiment, the base clamp member 182 is configured to engage a substantial portion or area of the front 140 of the motor 108 to maximize the frictional engagement between the motor 108 and the motor support 104.

In one embodiment, the base clamp member 182 is made of rubber material (e.g., to protect the engine/motor). In one embodiment, the base clamp member 182 is made of an appropriate plastic material. In one embodiment, the base clamp member 182 can be formed of a variety of different materials. For example, the base clamp member 182 can be formed of plastic, rubber, composite or other semi-rigid or resilient material. In one embodiment, the base clamp member 182 may be referred to as the (front) motor engaging member.

In one embodiment, each of the first and the second hinge members 124, 126 have three openings. In one embodiment, the first hinge member 124 includes the opening 170 that is configured to align on a same axis with the openings 160 (or 160*t* and 160*b*) of the base member 122 to receive the pivot member 168 so as to pivotably connect the first hinge member 124 to the base member 122. In one embodiment, the first hinge member 124 includes the opening 172 that is configured to align on a same axis with the openings 162 (or 162*t* and 162*b*) of the base member 122 to receive the lock member 178 so as to releasably lock the first hinge member 124 to the base member 122. In one embodiment, the first hinge member 124 includes opening 218 that is configured to align on a same axis with openings 220 (or 220*t* and 220*b*) of the first clamp member 128 to receive the pivot member 222 so as to pivotably connect the first hinge member 124 to the first clamp member 128. In one embodiment, the first hinge member 124 includes a projecting portion 230 that is configured to be received between parallel flanges 232 and 234 of the first clamp member 128 when the first hinge member 124 is pivotally connected with the first clamp member 128. In one embodiment, the projecting portion 230 of the first hinge member 124 is thinner than the rest of the first hinge member 124. In one embodiment, the opening 218 is formed on the projecting portion 230.

Similarly, in one embodiment, the second hinge member 126 includes the opening 174 that is configured to align on a same axis with the openings 164 (or 164*t* and 164*b*) of the base member 122 to receive the pivot member 169 so as to pivotably connect the second hinge member 126 to the base member 122. In one embodiment, the second hinge member 126 includes the opening 176 that is configured to align on a same axis with the openings 166 (or 166*t* and 166*b*) of the base member 122 to receive the lock member 179 so as to releasably lock the second hinge member 126 to the base member 122. In one embodiment, the second hinge member 126 includes opening 224 that is configured to align on a same axis with openings 226 (or 226*t* and 226*b*) of the second clamp member 130 to receive the pivot member 228 so as to pivotably connect the second hinge member 126 to the second clamp member 130. In one embodiment, the second hinge member 126 includes a projecting portion 236 that is configured to be received between parallel flanges 238 and 240 of the second clamp member 130 when the second hinge member 126 is pivotally connected with the second clamp member 130. In one embodiment, the projecting portion 236 of the second hinge member 126 is thinner than the rest of the second hinge member 126. In one embodiment, the opening 224 is formed on the projecting portion 236.

In one embodiment, the pin 168 is the first hinge pivot pin that pivotally connects the first hinge member 124 and the base member 122 to provide pivotal movement of the first hinge member 124 about a first vertical pivot axis and with respect to the base member 122. In one embodiment, the first vertical pivot axis and the second vertical pivot axis are spaced apart from and parallel to each other.

In one embodiment, the pin 169 is the second hinge pivot pin that pivotally connects the second hinge member 126 and the base member 122 to provide pivotal movement of the second hinge member 126 about a second vertical pivot axis and with respect to the base member 122. In one embodiment, the second vertical pivot axis passes through the pivot pin 169. That is, the second vertical pivot axis extends perpendicular to the paper in FIGS. 7-9.

In one embodiment, the first and second clamp members 128 and 130 are constructed and arranged to be pivotably adjustable with respect to their corresponding end portions of the first and second hinge members 124 and 126 and to support the portions of the motor 108 of the boat 110.

In one embodiment, the first clamp member 128 and the corresponding end portions of the first hinge member 124 have openings 220 (220*t*, 220*b*) and 218 that are configured to align on a same axis and to receive the first pivot member or pin 222 therein so as to pivotally connect the first clamp member 128 and the first hinge member 124. In one embodiment, the second clamp member 130 and the corresponding end portions of the second hinge member 126 have openings 226 (226*t*, 226*b*) and 224 that are configured to align on a same axis and to receive the pivot member or pin 228 therein so as to pivotally connect second clamp member 130 and the second hinge member 126.

Figure 7:
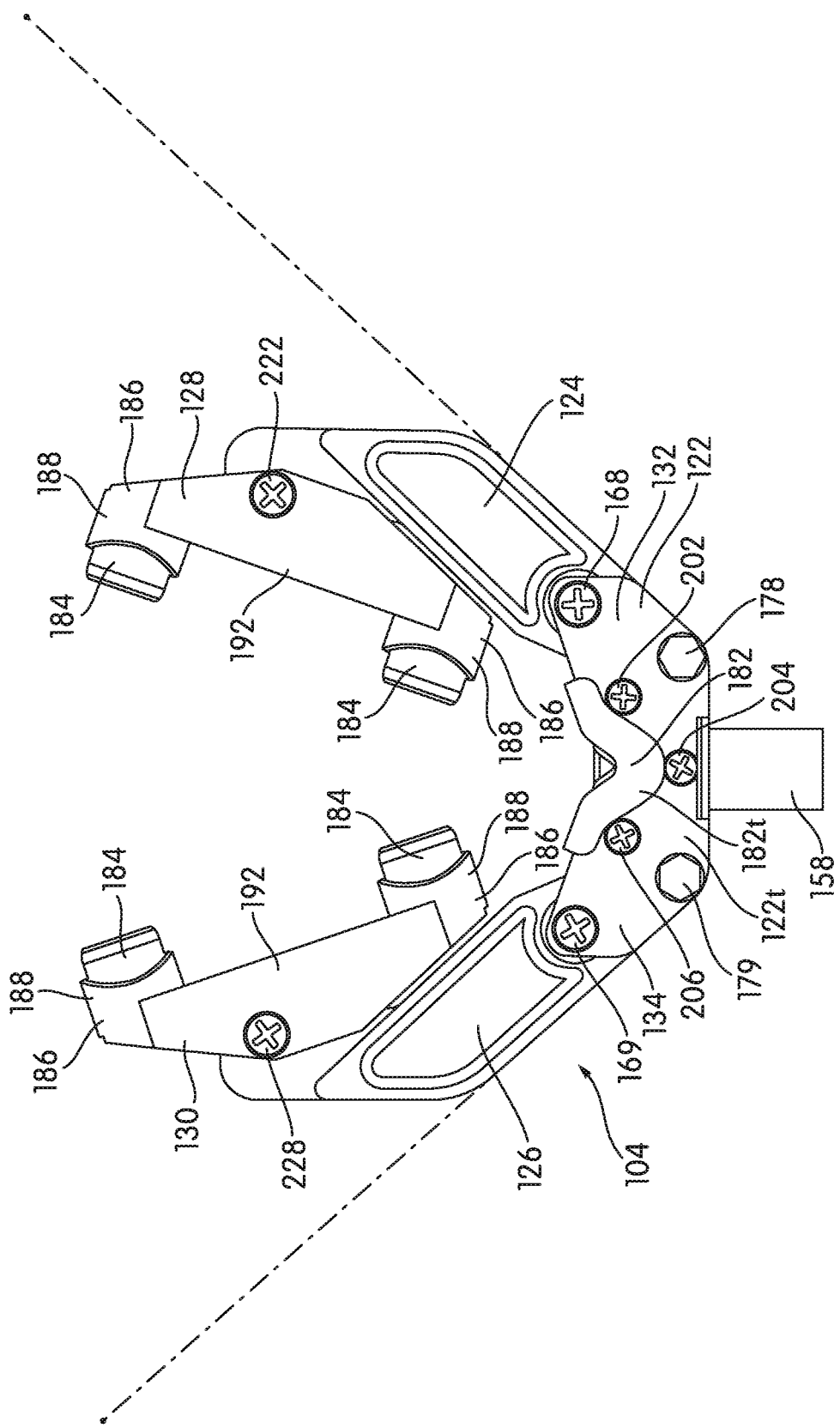
FIGS. 7-9 illustrate top plan views of a motor support of the system in accordance with an embodiment of the present patent application.
Figure 8:
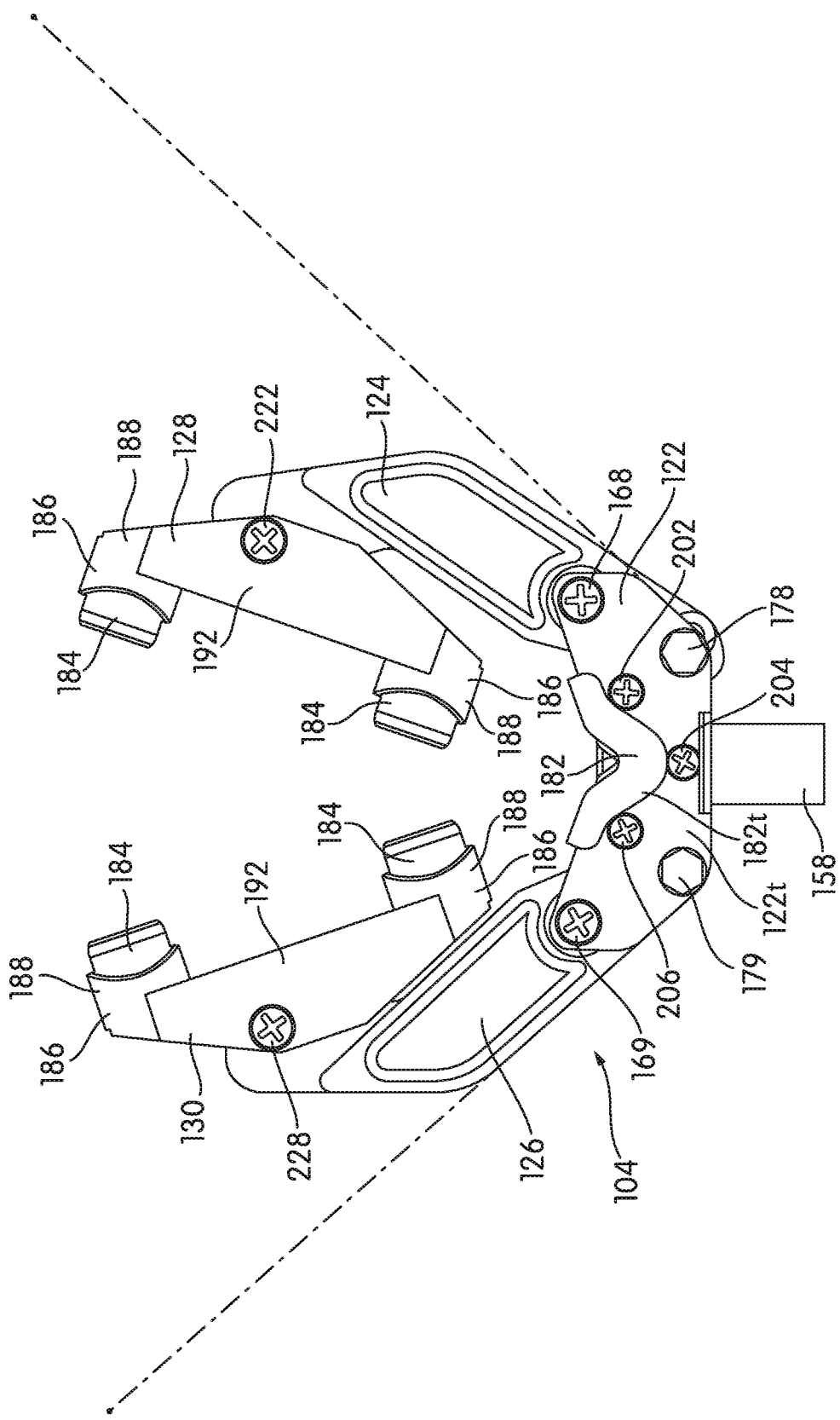
Figure 9:
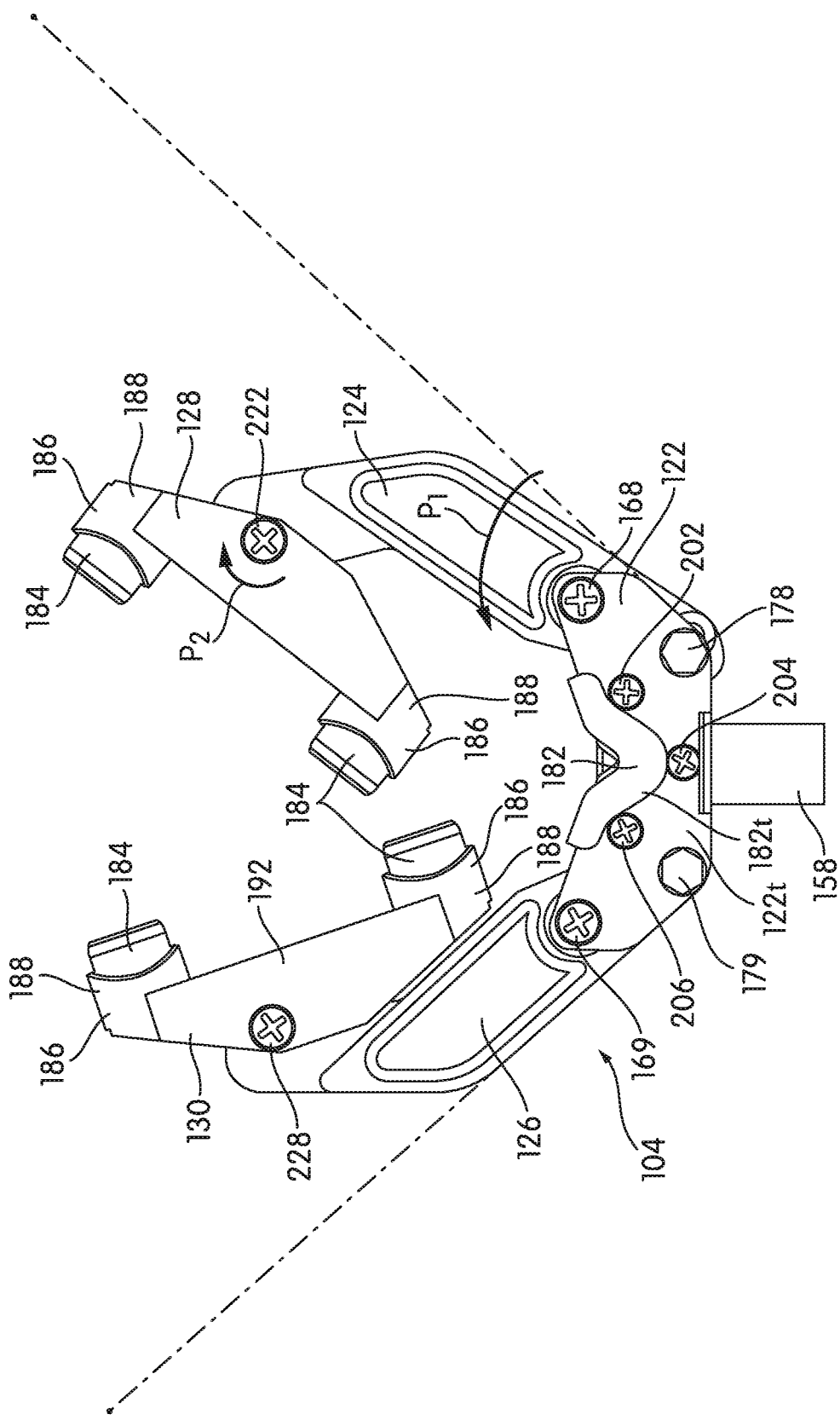

In one embodiment, the first pivot pin 222 pivotally connects the first hinge member 124 and the first clamp member 128 to provide pivotal movement of the first clamp member 128 about a first vertical pivot axis and with respect to the first hinge member 128. In one embodiment, the first vertical pivot axis passes through the pivot pin 222. That is, the first vertical pivot axis extends perpendicular to the paper in FIGS. 7-9. For example, FIGS. 7-9 show the pivotal movements of the first clamp member 128 about the first vertical pivot axis and with respect to the first hinge member 128.

In one embodiment, the second pivot pin 228 pivotally connects the second hinge member 126 and the second clamp member 130 to provide pivotal movement of the second clamp member 130 about a second vertical pivot axis and with respect to the second hinge member 126. In one embodiment, the second vertical pivot axis passes through the pivot pin 228. That is, the second vertical pivot axis extends perpendicular to the paper in FIGS. 7-9. In one embodiment, the second and the first vertical pivot axes are parallel to and are spaced apart from each another.

In one embodiment, the base member 122, the first and the second hinge members 124 and 126, and the first and the second clamp members 128 and 130 are made of an appropriate metal (such as aluminum or steel) or other material of suitable strength. In one embodiment, the base member 122, the first and the second hinge members 124 and 126, and the first and the second clamp members 128 and 130 are made of cast aluminum material. In one embodiment, the base member 122, the first and the second hinge members 124 and 126, and the first and the second clamp members 128 and 130 are made of molded plastic material. In one embodiment, the base member 122, the first and the second hinge members 124 and 126, and the first and the second clamp members 128 and 130 are made of any other suitable material or combination of materials having sufficient durability to support the motor 108 of the boat 110 while maintaining structural stability of the system 100.

In one embodiment, the first and the second hinge members 124 and 126 are made of cast aluminum material. In one embodiment, the first and the second clamp members 128 and 130 are made of plastic material (e.g., to protect the engine/motor).

In one embodiment, the system 100 includes bumpers 184 that are attached to portions 186 of each of the first and the second clamp members 128 and 130. In one embodiment, each of the first and the second clamp members 128 and 130 include receiving portions 188 that are configured to receive the bumpers 184 therein. In one embodiment, the bumpers 184 are attached to each of the first and the second clamp members 128 and 130 using fastener members 190. In one embodiment, the bumpers 184 are integrally formed with the each of the first and the second clamp members 128 and 130. In one embodiment, the bumpers 184 are attached to the each of the first and the second clamp members 128 and 130 using adhesive material.

In one embodiment, each bumper 184 includes surfaces made of high friction, resilient, rubber-like material for frictionally engaging the sides 136 and 138 of the motor 108 of the boat 110. In one embodiment, each bumper 184 is configured to frictionally engage the sides 136 and 138 of the motor 108 of the boat 110 to retain (firmly grip, or secure) the motor 108 in the motor support 104, for example, without separate fasteners. In one embodiment, each bumper 184 is configured to engage a substantial portion or area of the opposite sides 136 of 138 of the motor 108 to maximize the frictional engagement between the motor 108 and the motor support 104.

In the illustrative embodiment, two bumpers 184 are attached on the end portions 186 of each of the first and the second clamp members 128 and 130. In other embodiments, a single (larger, e.g., elongated) bumper may be attached on a central portion 192 of each of the first and the second clamp members 128 and 130. In one embodiment, the bumpers 184 can be formed of a variety of different materials. For example, the bumpers 184 can be formed of plastic, rubber, composite or other semi-rigid or resilient material. In one embodiment, the material of the bumpers 184 may be different from the material of the first and the second clamp members 128 and 130. In one embodiment, the bumpers may be referred to as the (side) motor engaging members.

In one embodiment, the first clamp member 128 has a first clamp surface (e.g., surfaces of the bumper or any other surface of the first clamp member 128 that engages with the sides of the motor) and the second clamp member 130 has a second clamp surface (e.g., surfaces of the bumper or any other surface of the second clamp member 130 that engages with the sides of the motor), and the first clamp member 128 and the second clamp member 130 are configured to receive and engage opposite sides of the motor 108 between the first clamp surface and the second clamp surface.

In one embodiment, the motor support 104 includes the connector portion 158 extending outwardly therefrom. In one embodiment, the connector portion 158 is constructed and arranged to be received by the end 118 of the support member 114. In one embodiment, the end 118 of the support member 114 has an opening to receive the connector portion 158 therein. In one embodiment, the connector portion 158 of the motor support 104 and the end 118 of the support member 114 each have corresponding openings that are configured to align on a same axis and to receive a lock member or pin (not shown) therein to lock the motor support 104 with the support member 114. In one embodiment, the lock pin is a releasable lock pin configured to releasably lock the motor support 104 with the support member 114. In one embodiment, the releasable lock arrangement between the motor support 104 and the support member 114 allows the user to use the same support member 114 with different sized motor supports and/or with motor supports having different configurations. In one embodiment, the releasable lock arrangement between the motor support 104 and the support shaft 114 allows the user to replace just the motor support 104 when it is worn out or damaged. In another embodiment, the motor support 104 may be integrally formed with the first support member 152 of the support member 114. For example, in one embodiment, the motor support 104 may be integrally formed at the end 118 of the first support member 152 of the support member 114.

In one embodiment, the system of the present patent application includes a lock assembly 500. In one embodiment, the lock assembly 500 is constructed and arranged to be coupled to the first hinge member 124 and the second hinge member 126. In one embodiment, the lock assembly 500 is configured to operate on the first hinge member 124 and the second hinge member 126. In one embodiment, the lock assembly 500 is configured to selectively lock the first hinge member 124 and the second hinge member 126 with respect to the base member 122, preventing the first hinge member 124 and the second hinge member 126 from pivoting in a generally horizontal plane about their pivot axes and with respect to the base member 122. In one embodiment, the lock assembly 500 is configured to selectively to release the first hinge member 124 and the second hinge member 126, permitting pivotal motion of the first hinge member 124 and the second hinge member 126 about their pivot axes and with respect to the base member 122.

In one embodiment, the lock assembly 500 includes the lock pin members 178 and 179. In one embodiment, the lock pin member 178 of the lock assembly 500 is tightened to lock the first hinge member 124 (in place and) with respect to the base member 122. In one embodiment, the lock pin member 179 of the lock assembly 500 is tightened to lock the second hinge member 126 (in place and) with respect to the base member 122.

In one embodiment, the lock pin member 178 of the lock assembly 500 is loosened to allow/permit pivotal movement of the first hinge member 124 with respect to the base member 122. In one embodiment, the lock pin member 179 of the lock assembly 500 is loosened to allow/permit pivotal movement of the second hinge member 126 with respect to the base member 122.

The operation of the system 100 is described below. In one embodiment, a method for supporting the motor 108 of the boat 110 with respect to the boat trailer 106 using the motor support 104 is provided. In one embodiment, the method comprises pivotably adjusting each of the first and the second hinge members 124, 126 with respect to the base member 122; and pivotably adjusting the first and the second clamp members 128, 130 with respect to the first and the second hinge members 124, 126, respectively, In one embodiment, cooperable adjustment between the first and the second clamp members 128, 130 and the first and the second hinge members 124, 126 facilitates engagement of opposite sides of the motor 108 with the first and the second clamp members 128, 130, respectively, and engagement of the front of the motor 108 with the base member 122.

To attach the system 100 to the boat trailer 106, the user of the system 100 first actuates or operates the latch mechanism 142. After actuating or operating the latch mechanism 142, the user then couples the trailer connector 102 to the portion 112 of the boat trailer 106. In one embodiment, when the user couples the trailer connector 102 to the boat trailer 106, the user allows the latch mechanism 142 to close or release (e.g., under a spring bias) thereby releasably or removably securing the trailer connector 102 of the system 100 to the portion 112 of the boat 110. It is contemplated that other portions of the boat trailer 106 may be used for attaching the system 100. After coupling the trailer connector 102 to the boat trailer 106, the user then supports the boat motor 108 by positioning the motor support 104 against the boat motor 108. In one embodiment, the latch mechanism 142 is actuated or operated using the manually engageable member 148.

In one embodiment, as shown in FIG. 9, as the first hinge member 124 pivotally moves about the pin 168 (e.g., in the direction $P_1$) and with respect to the base member 122, the first clamp member 128 is configured to be pivotally movable about the pin 222 (e.g., in the direction $P_2$) and with respect to the first hinge member 124.

In one embodiment, each of the first and the second hinge members 124 and 126 extending from spaced locations 132 and 134 on the base member 122 is pivotally adjustable with respect to the base member 122. This adjustment facilitates the engagement of the front 140 of the motor 108 with the base member 122. This adjustment also enables the adjustment of the first and the second clamp members 128 and 130 such that the first and the second clamp members 128 and 130 receive the motor 108 therebetween and engage opposite sides 136 and 138 of the motor 108.

Figure 10:
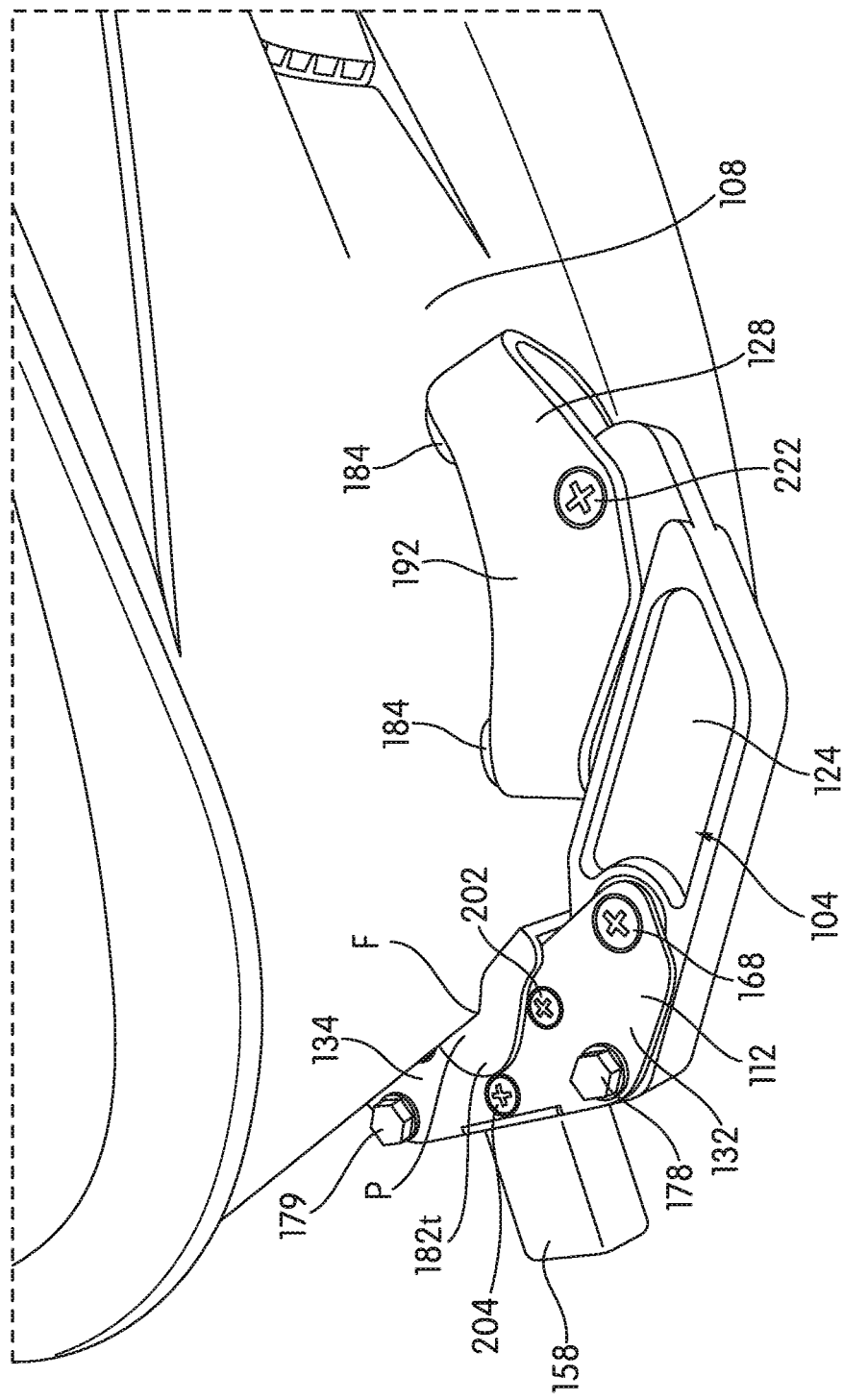
FIG. 10 illustrates a partial, perspective view of the system for supporting the boat motor with respect to the boat trailer in accordance with an embodiment of the present patent application.

In one embodiment, referring to FIG. 10, when the first and the second clamp members 128 and 130 engage opposite sides 136 and 138 of the motor 108 and the base member 122 engages with the front 140 of the motor 108, then the lock assembly 500 (including the lock pin members 178 and 179) is moved to the lock position so as to lock the first hinge member 124 and the second hinge member 126 (in their places and) with respect to the base member 122.

Comparing FIG. 10 of the present patent application with the prior art system in FIG. 1, it is clear that, when the motor 108 of the present patent application is being supported by the motor support 104, no gap G exists between the front F of the motor 108 and a portion P of the motor support 104. In one embodiment, when the motor 108 is being supported by the motor support 104, the base member 122 engages with the front 140 of the motor 108 and the first and the second clamp members 128 and 130 engage opposite sides 136 and 138 of the motor 108. That is, when the motor 108 is being supported by the motor support 104, the load applied by the motor 108 on the motor support 104 is evenly distributed throughout the entire periphery of the motor support 104. In one embodiment, with the system 100 of the present patent application, all the load is inline with the motor support 104 and there is no side load pressure.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A system for supporting a motor of a boat with respect to a boat trailer comprising:
    a support member having a first end portion and a second end portion;
    a trailer connector disposed at the first end portion of the support member, the trailer connector constructed and arranged to be releasably attached to a portion of the boat trailer; and
    a motor support disposed at the second end portion of the support member, the motor support constructed and arranged to frictionally engage portions of the motor of the boat,
    the motor support comprising:
        a base member;
        first and second hinge members extending from spaced locations on the base member, the first hinge member being pivotally adjustable about a first hinge member pivot axis and with respect to the base member, and the second hinge member being pivotally adjustable about a second hinge member pivot axis and with respect to the base member;
        a first clamp member pivotally connected with the first hinge member to provide pivotal movement of the first clamp member about a first clamp member pivot axis and with respect to the first hinge member; and
        a second clamp member pivotally connected with the second hinge member to provide pivotal movement of the second clamp member about a second clamp member pivot axis and with respect to the second hinge member,
    wherein the first and the second clamp members, and the first and the second hinge members being adjustably cooperable to receive and engage opposite sides of the motor, and to facilitate engagement of the front of the motor with the base member.

2. The system of claim 1, further comprises a lock assembly configured to lock the first and the second hinge members with respect to the base member.

3. The system of claim 2, wherein, when the first and the second clamp members receive and engage the opposite sides of the motor and when the base member engages the front of the motor, the first and the second hinge members are locked with respect to the base member by the lock assembly.

4. The system of claim 3, wherein the lock assembly includes a first lock member operatively connected with the first hinge member and the base member and a second lock member operatively connected with the second hinge member and the base member.

5. The system of claim 1, wherein the first clamp member has a first clamp surface and the second clamp member has a second clamp surface, and wherein the first and the second clamp members are configured to receive and engage opposite sides of the motor between the first and the second clamp surfaces.

6. The system of claim 1, wherein the motor support is configured to be removably attached to the support member.

7. The system of claim 1, wherein the base member includes surfaces that are configured to frictionally engage the front of the motor.

8. The system of claim 1, wherein the first clamp member pivot axis includes a first vertical pivot axis and the second clamp member pivot axis includes a second vertical pivot axis, and
    further comprises a first pivot pin that pivotally connects the first hinge member and the first clamp member to provide the pivotal movement of the first clamp member about the first vertical pivot axis and with respect to the first hinge member.

9. The system of claim 8, further comprises a second pivot pin that pivotally connects the second hinge member and the second clamp member to provide the pivotal movement of the second clamp member about the second vertical pivot axis and with respect to the second hinge member, and wherein the first vertical pivot axis and the second vertical pivot axis are spaced apart from and parallel to each other.

10. The system of claim 1, wherein the first hinge member pivot axis includes a first vertical pivot axis and the second hinge member pivot axis includes a second vertical pivot axis, and
    further comprises a first hinge pivot pin that pivotally connects the first hinge member and the base member to provide pivotal movement of the first hinge member about the first vertical pivot axis and with respect to the base member.

11. The system of claim 10, further comprises a second hinge pivot pin that pivotally connects the second hinge member and the base member to provide pivotal movement of the second hinge member about the second vertical pivot axis and with respect to the base member, and wherein the first vertical pivot axis and the second vertical pivot axis are spaced apart from and parallel to each other.

12. A system for supporting a motor of a boat with respect to a boat trailer comprising:
   a motor support comprising:
      a base member;
      first and second hinge members extending from spaced locations on the base member, the first hinge member being pivotably adjustable about a first hinge member pivot axis and with respect to the base member, and the second hinge member being pivotably adjustable about a second hinge member pivot axis and with respect to the base member;
      a first clamp member pivotably connected with the first hinge member to provide pivotal movement of the first clamp member about a first clamp member pivot axis and with respect to the first hinge member; and
      a second clamp member pivotably connected with the second hinge member to provide pivotal movement of the second clamp member about a second clamp member pivot axis and with respect to the second hinge member,
   wherein the first and the second clamp members, and the first and the second hinge members being adjustably cooperable to receive and engage opposite sides of the motor, and to facilitate engagement of the front of the motor with the base member.

13. A method for supporting a motor of a boat with respect to a boat trailer using a motor support, the motor support comprising a base member, first and second hinge members extending from spaced locations on the base member and pivotably connected with the base member, and first and second clamp members pivotably connected with the first and the second hinge members, respectively, the method comprising:
   pivotably adjusting the first hinge member about a first hinge member pivot axis and with respect to the base member;
   pivotably adjusting the second hinge member about a second hinge member pivot axis and with respect to the base member;
   pivotably adjusting the first clamp member about a first clamp member pivot axis and with respect to the first hinge members; and
   pivotably adjusting the second clamp member about a second clamp member pivot axis and with respect to the second hinge member,
   wherein cooperable adjustment between the first and the second clamp members and the first and the second hinge members facilitates engagement of opposite sides of the motor with the first and the second clamp members, respectively, and engagement of the front of the motor with the base member.

* * * * *